United States Patent
Chen et al.

(10) Patent No.: US 11,415,705 B2
(45) Date of Patent: Aug. 16, 2022

(54) METHOD, APPARATUS FOR CARRIER-PHASE CYCLE-SLIP DETECTION AND REPAIR

(71) Applicant: UNICORE COMMUNICATIONS, INC., Beijing (CN)

(72) Inventors: Kongzhe Chen, Beijing (CN); Gang Hu, Beijing (CN); Lei Huang, Beijing (CN)

(73) Assignee: UNICORE COMMUNICATIONS, INC., Beijing (CN)

( * ) Notice: Subject to any disclaimer, the term of this patent is extended or adjusted under 35 U.S.C. 154(b) by 89 days.

(21) Appl. No.: 17/089,779

(22) Filed: Nov. 5, 2020

(65) Prior Publication Data

US 2021/0373178 A1 Dec. 2, 2021

Related U.S. Application Data

(63) Continuation of application No. 16/134,664, filed on Sep. 18, 2018, now Pat. No. 10,830,902.

(Continued)

(51) Int. Cl.
*G01S 19/44* (2010.01)
*G01S 19/29* (2010.01)
*G01S 19/51* (2010.01)

(52) U.S. Cl.
CPC .............. *G01S 19/29* (2013.01); *G01S 19/44* (2013.01); *G01S 19/51* (2013.01)

(58) Field of Classification Search
CPC ................................ G01S 19/44; G01S 19/29

(Continued)

(56) References Cited

U.S. PATENT DOCUMENTS

| 5,471,217 A | 11/1995 | Hatch et al. |
| 6,397,147 B1 | 5/2002 | Whitehead |

(Continued)

FOREIGN PATENT DOCUMENTS

| CN | 107102346 A | * | 8/2017 | ............. G01S 19/44 |
| CN | 108169774 A | * | 6/2018 | ............. G01S 19/27 |

(Continued)

OTHER PUBLICATIONS

Teunissen, P.J.G., "The least-squares ambiguity decorrelation adjustment: a method for fast GPS integer ambiguity estimation", J. Geodesy. 1995, vol. 70, pp. 65-82.

*Primary Examiner* — Harry K Liu
(74) *Attorney, Agent, or Firm* — Hauptman Ham, LLP

(57) ABSTRACT

A method of determining position includes observing a first signal from a first source at a first epoch. The method includes observing a second signal from the first source at a second epoch. The method includes observing a third signal from a second source at the first epoch. The method includes observing a fourth signal from the second source at the second epoch. The method includes generating a first set of comparison data based on the first signal and the second signal. The method includes generating a second set of comparison data based on the third signal and the fourth signal. The method includes determining whether cycle-slip exists based on the first set of comparison data and the second set of comparison data. The method includes determining a current position of a standalone global navigation satellite system (GNSS) receiver in response to a determination that cycle-slip does not exist.

14 Claims, 2 Drawing Sheets

Related U.S. Application Data

(60) Provisional application No. 62/687,988, filed on Jun. 21, 2018.

(58) Field of Classification Search
USPC .................................................. 342/357.27
See application file for complete search history.

(56) References Cited

U.S. PATENT DOCUMENTS

| | | | | |
|---|---|---|---|---|
| 6,496,778 | B1 * | 12/2002 | Lin | .................. G01S 19/55 701/472 |
| 6,664,923 | B1 | 12/2003 | Ford | |
| 2006/0100781 | A1 * | 5/2006 | Lin | .................. G01C 21/28 701/472 |
| 2014/0113608 | A1 | 4/2014 | Wirola et al. | |
| 2015/0301190 | A1 | 10/2015 | Osipov et al. | |
| 2020/0116873 | A1 | 4/2020 | Yamazaki | |

FOREIGN PATENT DOCUMENTS

| | | | | |
|---|---|---|---|---|
| CN | 108873034 A | * | 11/2018 | |
| CN | 106405592 B | * | 5/2019 | ........... G01S 19/235 |

\* cited by examiner

METHOD, APPARATUS FOR CARRIER-PHASE CYCLE-SLIP DETECTION AND REPAIR

PRIORITY CLAIM AND CROSS-REFERENCE

The present application is a Continuation of U.S. application Ser. No. 16/134,664, filed Sep. 18, 2018 (U.S. Pat. No. 10,830,902, issuing Nov. 10, 2020) and claims priority from U.S. Provisional Application No. 62/687,988, filed Jun. 21, 2018, the disclosures of each which are hereby incorporated by reference herein in their entireties.

BACKGROUND

Portable Global Navigation Satellite System (GNSS) receivers that report with accuracy below the meter level sometimes use reference stations or reference receivers for position correction. Position correction occurs through signal error reduction and/or elimination, wherein a known, or surveyed, position of a reference receiver is compared to a determined position of the reference receiver based on a signal received at the reference receiver at an epoch, determining a position correction based on the signal received at the reference receiver at the epoch, and applying the position correction to a rover, or portable GNSS receiver.

Position correction with reference receiver stations incurs users costs associated with purchasing and installing reference receiver equipment, communication equipment to transmit position correction information to portable receivers, and network or transmission services to communicate correction information.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
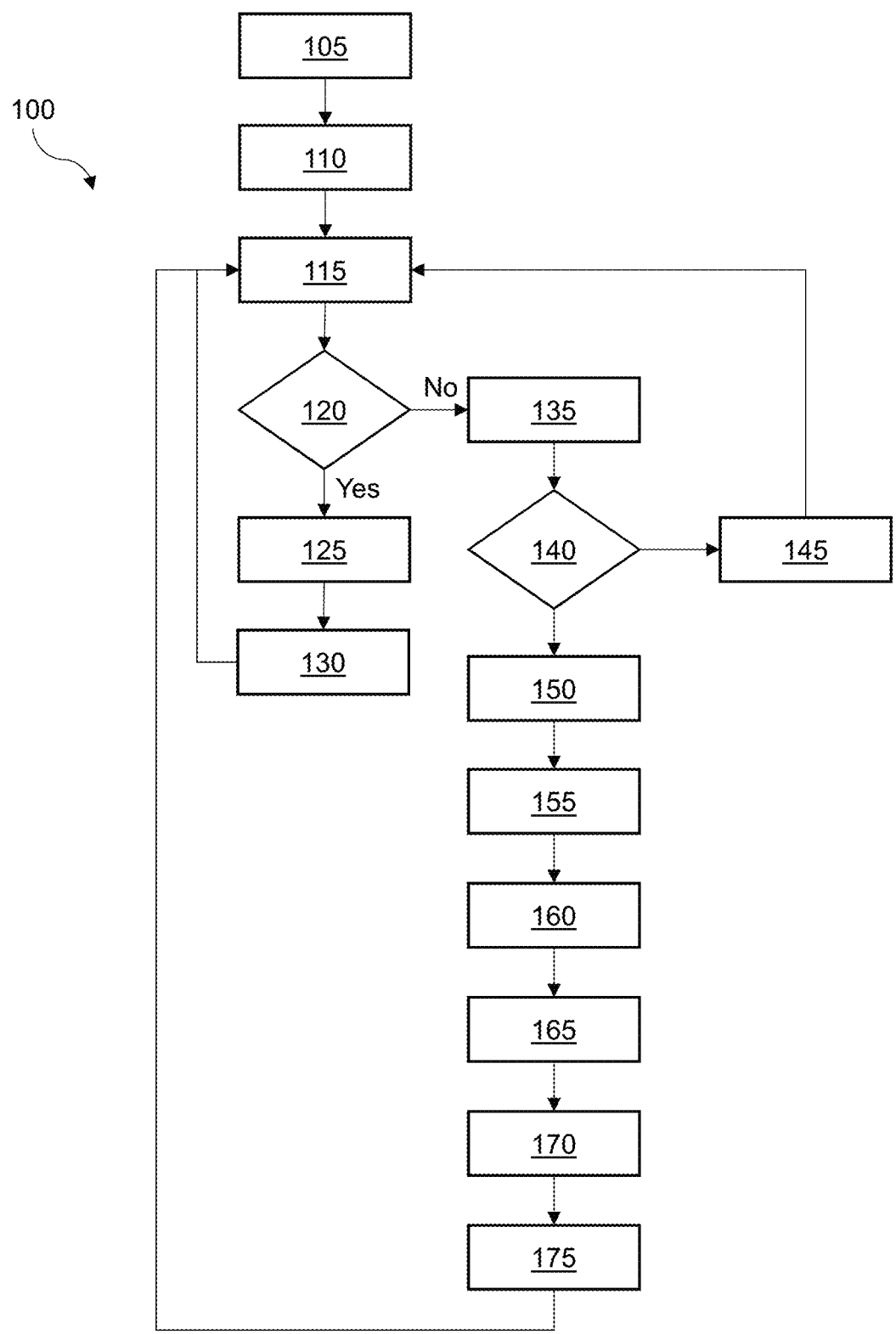
FIG. 1 is a flow diagram of a method of determining position using a standalone GNSS receiver, in accordance with some embodiments.

The following disclosure provides many different embodiments, or examples, for implementing different features of the provided subject matter. Specific examples of components, values, operations, materials, arrangements, etc., are described below to simplify the present disclosure. These are, of course, merely examples and are not intended to be limiting. Other components, values, operations, materials, arrangements, etc., are contemplated. In addition, the present disclosure may repeat reference numerals and/or letters in the various examples. This repetition is for the purpose of simplicity and clarity and does not in itself dictate a relationship between the various embodiments and/or configurations discussed.

Global Navigation Satellite Systems (GNSS) are widely used for positioning, navigation, and timing. Global Navigation Satellite Systems include the United States' Global Positioning System (GPS), Russia's Global Navigation System (GLONASS), China's Beidou Navigation Satellite System (BDS), the European Union's Galileo Satellite Navigation System (Galileo), Japan's Quasi-Zenith Satellite System (QZSS), and the Indian Regional Navigation Satellite System (IRNSS).

A GNSS receiver tracks signals from satellites of one, several or all of the global navigation systems listed above and determines, based on the received signals, pseudo-range and carrier phase measurements that are used to determine a GNSS receiver position. Signals and associated position measurements are degraded by systematic errors such as ionospheric effects, tropospheric delay, multipath, and so forth. Imprecision in satellite orbit and clock measurements that are calculated from real-time navigation messages also contribute to position uncertainty. Although ionospheric effects are mitigated by using dual-frequency measurements, and tropospheric delay is mitigated using meteorological data to model signal degradation, the errors resulting from ionospheric effects and tropospheric delays still accumulate up to several meters in position uncertainty in some instances. Thus Standard Point Positioning (SPP) is only accurate to several meter levels, even using dual-frequency GNSS receivers to mitigate ionospheric effects in some instances.

Satellite Based Augmentation Systems (SBAS) such as Wide Area Augmentation System (WAAS), European Geostationary Navigation Overlay Service (EGNOS), and Multi-Functional Satellite Augmentation System (MSAS) provide orbit and clock corrections and further provide ionospheric grids for single frequency GNSS receivers to mitigate ionospheric effects. Global positioning using SBAS corrections routinely achieves meter-level accuracy, and sometimes achieves sub-meter level accuracy. Positioning accuracy of a standalone receiver improves positioning accuracy to meter level with SBAS corrections. SBAS involves real-time corrections that are free to a GNSS receiver user.

Precise Point Positioning (PPP), using more accurate orbit and clock products, and dual-frequency carrier phase measurements, is able to achieve centimeter level converged accuracy. The precise products used for real-time PPP are transmitted over geostationary satellite with L-Band signal, or over Internet. However, receivers that lack L-Band or Internet capability are unable to benefit from PPP. Unlike SBAS corrections, real-time precise products used for PPP are not free to a GNSS receiver user. A further drawback of PPP is the amount of convergence time to achieve a position determination. PPP convergence to centimeter-level accuracy takes longer than 10 minutes in some instances. Even with PPP ambiguity resolution (AR), the time to fix of PPP is still up to several minutes in some instances.

Real-time positioning methods circumvent the convergence delay concerns associated with PPP. Two principal methods of real-time positioning are Real-Time Kinematic (RTK) and Differential GPS (DGPS). DGPS uses pseudo-range measurements to determine position. Due to limitations on the resolution of measurements based on pseudo-range noise and multipath determination, DGPS positioning is limited to sub-meter level accuracy schemes. Real-Time Kinematic is a method of positioning that employs reference stations or reference receivers more quickly than PPP. RTK uses carrier phase measurements, which are much more accurate than pseudo-ranges, but sometimes provide ambiguous results. RTK positioning achieves centimeter level accuracy after the double-differenced ambiguities are fixed. The following method of ambiguity resolution (AR) (Teunissen, P. J. G., *The least-squares ambiguity decorre-*

*lation adjustment: A method for fast GPS integer ambiguity estimation*. J. GEODESY. 1995, Volume 70, pp 65-82) is incorporated herein by reference. RTK is the most widely used satellite positioning system when centimeter level accuracy is sought. Further, RTK methods provide greater accuracy than DGPS, down to centimeter-level accuracy, which is comparable to PPP accuracy. To achieve centimeter-level accuracy, and because of the convergence delay associated with PPP, RTK is more commonly used in terrestrial positioning. PPP is a predominant method of positioning in maritime applications, where reference receivers are not feasible.

RTK positioning improves GNSS receiver accuracy by use of a reference station or reference receiver. Both real and virtual reference receiver are used in RTK positioning methodologies. A real reference receiver is a GNSS receiver tied to a single, fixed location that has been accurately measured or surveyed. Network RTK uses a receiver connected to a communication device such as an Internet connection and/or a radio transmitter. When a rover and a reference station are physically close, the error sources described above are common or correlated because the signals received by each of the rover and reference station passed through near-identical paths, with similar temperatures, thicknesses, ionization, refractive indices, and so forth. When differencing with regard to a reference receiver during a same epoch, common errors, such as satellite clock error, are reduced or eliminated, and correlated error sources such as satellite orbit error, ionospheric effect and tropospheric delay, are mitigated.

The use of reference receiver increases the operational cost and complexity of RTK positioning. A communication device, such as a radio or an Internet connection, is used to coordinate signals between a reference receiver and a portable GNSS receiver, or rover. The cost associated with setup and maintenance of a reference station, which normally includes a high quality GNSS receiver, a surveying GNSS antenna, and of a communication device to distribute RTK correction data, is significantly more than a cost of a portable GNSS receiver. To reduce the cost of RTK positioning, some users employ a Network RTK service. Network RTK service providers send real or virtual reference data to customers. Costs of Network RTK services are often still charged to a system user on, e.g., a per-minute basis.

Other types of standalone GNSS receivers struggled to achieve centimeter level kinematic positioning in real-time. Real-time PPP requires precise orbit and clock products, and RTK requires reference data. One method of improving standalone GNSS receiver performance includes methods described by R. Hatch (Hatch, R., 1995, Method and apparatus for smoothing code measurements in a global positioning system receiver, U.S. Pat. No. 5,471,217), M. L. Whitehead (Whitehead M. L., 2002, Relative GPS positioning using a single GPS receiver with internally generated differential correction terms, U.S. Pat. No. 6,397,147), and Ford (Ford, T. J., 2003, Position and velocity Kalman filter for use with global navigation satellite system receivers, U.S. Pat. No. 6,664,923), which are incorporated herein by reference. Hatch describes using carrier phase to smooth pseudo-range and reduce multipath and the noise of pseudo-range to improve positioning accuracy. Whitehead describes using internally generated differential corrections from an initial or initial epoch to get differenced position relative to an initial point, or a waypoint at which the corrections are computed for the initial epoch. The corrections are retained until the standalone GNSS receiver either returns to the start point or arrives at a different waypoint. The satellites visible to the standalone GNSS receiver (common view satellites) change during navigation, due to signal blockage or satellites traveling below the horizon. Further, satellite orbit and clock errors, ionospheric and tropospheric effects also change slowly. As the calculated corrections age, the correlation of error sources between current epoch and the initial epoch weakens. Whitehead describes using only smoothed pseudo-ranges, so the resulting positional accuracy is less accurate than the sub-meter level accuracy of DGPS.

Ford describes using delta phase, Doppler and pseudo-range measurements in a Kalman filter, namely PDP Kalman filter, to improve position accuracy. In PDP Kalman filter, delta phases are used to estimate position errors of both current and previous epochs. Because a PDP Kalman filter of delta phase data is more precise than pseudo-range measurements, the Ford method provides smoother transitions between positions than point positioning. A disadvantage of the Ford method is that PDP Kalman filter uses continuous tracking between epochs to get delta phase measurements. Once a portable GNSS receiver loses tracking of a majority of satellites present at the start of tracking, the PDP filter has to be reset, causing a jump or discontinuity in the reported the standalone GNSS receiver position.

In at least one embodiment of the present disclosure, a standalone GNSS receiver saves the coordinate determined at any epoch, as a reference coordinate. The reference coordinate is precisely surveyed, measured, or calculated. Pseudo-range and carrier phase measurements of the epoch are measured and saved as reference data associated with the reference coordinate at the reference epoch. The coordinate and measurements work as reference data for later epochs. At later epoch, the standalone GNSS receiver performs a RTK process using the current epoch measurements, the reference data, and the reference coordinate. When there is no cycle slip between the reference data and current epoch data, all ambiguities are zero and the position of current epoch is centimeter level accurate relative to the reference coordinate. When there has been loss of signal lock, or cycle slips for some carrier phases, ambiguity resolution (AR) is performed prior to the RTK process. Once the ambiguities are resolved, the coordinate of current epoch retains centimeter level accuracy relative to the reference coordinate. The coordinate and measurements of the ambiguity fixed epoch will be saved as new reference data for future positioning, old reference data will be discarded, and so forth. When ambiguity resolution is not successful at fixing ambiguity to integer, the current or original reference data is used for reporting position of the standalone GNSS receiver until an epoch when ambiguity resolution is successful. Upon successful ambiguity resolution, initial or original reference is replaced by new reference data associated with the epoch at which ambiguity resolution succeeded. For current epoch after a reference epoch, the standalone GNSS receiver uses satellite signal to calculate comparison data used to determine a current coordinate. The comparison data and reference data are calculated in similar manners. Thus, when ambiguity resolution succeeds after partial or complete signal lock, the current coordinate are as accurate as the reference location.

At epochs whose ambiguities are known, or have been resolved, the coordinates associated with the epochs are all centimeter-level accurate relative to the first reference position. The accuracy with which the reference position is measured or determined is passed down to the current positions determined at later epochs. Thus, a centimeter-level accurate reference position provides centimeter-level accuracy for later epochs with resolved ambiguities. For later epochs that have ambiguities that are float, the coordinates of the later epochs are at least decimeter-level accurate. At least one embodiment of the present disclosure works similar to traditional RTK, but generates reference data within the standalone GNSS receiver at the start of navigation or positioning. The reference data for a later epoch, or a current epoch, is not determine at a same epoch at a different coordinate, but at an initial epoch with respect to the later or current epoch. The present disclosure allows a standalone GNSS receiver to recover centimeter-level accurate positions once ambiguity resolution is successful after signal lock is reacquired. At least one embodiment of the present disclosure is capable of working in all scenarios where traditional RTK works, and provides comparable accuracy to a GNSS receiver used in conjunction with a reference station performing traditional RTK.

In some implementations of GNSS positioning, a user is concerned with relative position. Some GNSS receivers are used for relative positioning in agricultural settings. For example, sowing, harvesting, fertilizing, and/or spraying vehicles rely on accurate relative positioning on subsequent passes through a field to avoid wasting product or harming crops. In some embodiments, automated lawn mowers or Unmanned Aerial Vehicles (UAV) also rely on accurate relative positioning for subsequent passes through an area. Using traditional RTK methods to achieve high accurate relative positioning involves installing a reference receiver or using corrections from a network RTK service provider. With at least one embodiment of the present disclosure, a standalone GNSS receiver performs centimeter-level accurate relative positioning free of reliance on a reference receiver or a network RTK service provider.

FIG. 1 is a flow diagram of a method 100 of determining position using a standalone GNSS receiver, according to some embodiments. Method 100 includes an operation 105 in which a standalone GNSS receiver observes a signal from a global navigation system satellite. Subsequent to observing for a signal, the standalone GNSS receiver receives an observed signal and records the signal to the standalone GNSS receiver storage medium. The signal, or reference signal, is received at a reference epoch.

In an operation 110, the standalone GNSS receiver generates a set of reference data based on the reference signal at the reference epoch. The reference data includes a coordinate position at the reference epoch, and reference observables such as a reference pseudo-range measurement and a reference carrier phase measurement. The reference position, or reference coordinate, is precisely surveyed or estimated in order to help ensure that the reference position has centimeter-level accuracy. In some embodiments, the reference position is determined using point positioning, or some other suitable method of reaching centimeter-level accurate positioning. In some embodiments, the reference position is determined using a fixed survey point as a location reference. The reference data is saved to the standalone GNSS receiver storage medium for subsequent use in positioning at later epochs. In at least one embodiment of the present disclosure, a current epoch is an epoch at the time of a current measurement after the reference epoch. The current measurement at the current epoch includes a current pseudo-range and a current carrier phase.

The method 100 includes an operation 115, which the standalone GNSS receiver observes for another signal at a current epoch, an epoch after the reference epoch. At the current epoch, a signal is, or is not, received by the standalone GNSS receiver.

In an operation 120 of the method, the standalone GNSS receiver determines whether signal lock/signal continuity is preserved between the reference epoch and the current epoch. When there is signal lock/signal continuity between the reference epoch and the current epoch, the method continues to operation 125, wherein the standalone GNSS receiver generates a set of comparison data. The set of comparison data is generated based on the current signal at the current epoch and includes at least pseudo-range and carrier phase measurements.

In an operation 130, based on the set of comparison data, the standalone GNSS receiver determines a current position of the standalone GNSS receiver at the current epoch. In some embodiments, the standalone GNSS receiver also stores the current signal, the set of comparison data, and the current coordinate/current position in a storage medium, and reports the current position to a user of the standalone GNSS receiver or a device communicatively connected to the standalone GNSS receiver.

When the standalone GNSS receiver determines that there is a loss of signal lock, or a break in signal continuity, the method continues from operation 120 to operation 135. In operation 135, the standalone GNSS receiver observes for a signal at a current epoch after the reference epoch. At the current epoch, a signal is, or is not, received by the standalone GNSS receiver.

Method 100 continues in an operation 140 wherein the standalone GNSS receiver determines whether a signal has been received at the standalone GNSS receiver. When signal has not been observed, or when the position determination returns a negative result, or when signal lock has not been restored, or the signal continuity has not been restored, the method continues in an operation 145, wherein the standalone GNSS receiver reports a current position of the standalone GNSS receiver at the current epoch. From operation 145, the method returns to operation 115. When, the signal has been observed, or signal lock has been restored, or the signal continuity has been restored, the method continues from operation 140 to operation 150. In operation 150, the standalone GNSS receiver performs an ambiguity resolution process according to the method described herein to resolve a position ambiguity.

The method 100 includes operation 155, wherein a real-time kinematic (RTK) process is performed according to methods described herein, to establish a correct current position coordinate. Method 100 includes an operation 160, wherein based on the signal received at the current epoch, the standalone GNSS receiver generates a set of comparison data received at the current epoch. The set of comparison data includes pseudo-range and carrier phase measurements that are used to determine a GNSS receiver position.

Method 100 further includes an operation 165 wherein, based on the set of comparison data, the standalone GNSS receiver reports a current position coordinate. Method 100 includes an operation 170, wherein, subsequent to observation of a signal in operation 135, the current reference data are erased or deleted from the standalone GNSS receiver. In an operation 175, the current epoch, e.g., the epoch at which the signal was restored, or signal lock was restored, and based on which the current position is determined, becomes the new reference epoch. In operation 175, the current position is assigned to the new reference position, and the set of comparison data becomes the new reference data. The method 100 then returns to operation 115 for signal observation in current epochs after the new reference epoch.

Unlike traditional RTK processes, at least one preferred embodiment of the present disclosure instructs on how to use the reference data, the saved position and observables of the reference epoch, as a reference receiver for the standalone GNSS receiver in current epochs after a reference epoch. When there is no cycle slip between the reference data, taken at the reference epoch, and set of comparison data at the current epoch, all positional or coordinate ambiguities are zero and the position of current epoch is centimeter level accurate relative to the reference coordinate. If signal lock is lost, or signal loss occurs, between the reference epoch and a current epoch, ambiguity resolution is performed to get high accurate relative position between the reference epoch and the current epoch. When signal loss has occurred, or signal lock is lost, the reference data, the saved position and observables of the reference epoch, act as a reference receiver for RTK processing until the coordinate ambiguities are resolved. Once the ambiguities are resolved or reduced to zero, the position of the standalone GNSS receiver at the current epoch is centimeter accurate with respect to the original reference position, then the set of comparison data, including current position and current observables become new reference data and act as a new reference receiver. Thus, a standalone GNSS receiver is configured to measure and retain centimeter-level accuracy during operation. The accuracy of an original or reference position is retained or inherited for subsequent epochs, provided that signal continuity is retained, or regained after signal loss or discontinuity.

In other RTK, position accuracy arises from double-differenced observable equations between measurements collected at the same epoch from two receivers at different locations. In at least one embodiment of the present disclosure, position accuracy arises from double-differenced observable equations between measurements collected at different epochs from a standalone receiver. Resolution of double-differenced ambiguities involves addressing and mitigating error sources such as ionospheric effects, tropospheric delay, and satellite orbit errors, even though positional inaccuracy related to these error sources is very small after double-differencing. In other RTK, measurements of reference receiver and GNSS receiver, or rover, collect signals at the same time, eliminating satellite clock error as a source of positional error. In the present disclosure, satellite clock error is a factor to consider when performing position determination because signals are measured at different epochs. Multipath errors correlate between epochs, and are nearly completely eliminated by single differencing between epochs. Carrier phase noise is also a very small, less than 1 millimeter. Residuals causing by multipath and carrier noise are white noise and not accumulated over time. Their contribution to position error is millimeter level. In the present disclosure, they are treated as white noise.

Error sources, such as satellite orbit and clock errors, accumulate slowly, normally less than 1 millimeter per 1 second. After single differencing between epochs, which are sampled at least one time per second, the residuals are very small, less than 1 millimeter. However, positional error causing by satellite orbit and clock errors is accumulated over time. If they are not dealt with correctly, positioning error would be accumulated up to decimeter level after tens of minutes of time. So does the atmospheric effects. Ionospheric effects and tropospheric delay are satellite elevation depending, changes a little bit faster than orbit and clock errors. After using a Klobuchar model for ionospheric effects and a Saastamoinen model for troposphere delay, the residuals of double-differenced ionosphere and troposphere are very small, sometimes less than 1 millimeter within 1 second. But positional error causing by ionosphere and troposphere residuals is accumulated over time. If they are not dealt with correctly, positioning error would be accumulated up to decimeter level after tens of minutes of time. These residuals are addressed with in at least one embodiment of the present disclosure to provide high performance.

The errors mentioned above are grouped into dispersive errors and geometric errors. Because the ionosphere is a dispersive medium, ionospheric effects cause phase advance and pseudo-range group delays, and the effects dependent on the square of the frequency of the signal received by a GNSS receiver. Ionospheric error is dispersive in nature, because it depends on signal transmission through a dispersive medium. Satellite orbit error, clock error, and troposphere error are based on geometry of the components of a global navigation system and are frequency independent. Frequency independent errors are called geometric error in at least one embodiment of this description. Geometric error is the same for both pseudo-range and carrier phase measurements of one satellite.

In at least one embodiment of the present disclosure, error sources are mitigated according to the procedures and methods described below. Other means of mitigating error are also envisioned in the present disclosure and are known to practitioners of the art. Ionosphere effects are initially modeled with Klobuchar model before the amount of ionospheric error is estimated by a double-differenced residual. Geometric error, in the form of tropospheric delay, is initially modeled with the Saastamoinen model, and the double-differenced residual is estimated together with double-differenced satellite orbit and clock residuals.

At least one embodiment of the present disclosure works with continuous signal tracking between a current epoch and the reference epoch. At least one embodiment of the present disclosure works after interruptions in signal tracking between a current epoch and the reference epoch. Thus, should the standalone GNSS receiver passes a bridge, a tunnel, or any other blockage that interrupts signal lock with a satellite, the method described herein still recovers centimeter level accurate positioning once the receiver reacquires the signal and performs a RTK process between the epoch prior to signal lock, and the an epoch after signal reacquisition. Thus, at least one embodiment of the present disclosure works for any situation that employs other RTK.

A standalone GNSS receiver that performs method 100 tracks, in some embodiments, one or more of the following global navigation systems: GPS, GLONASS, BDS, Galileo, QZSS, IRNSS, and so forth. In some embodiments, the receiver is a single-frequency receiver. In some embodiments, the receiver is a multi-frequency receiver. Thus, the receiver is configured to track a single frequency, or dual-frequencies, or triple-frequencies to determine pseudo-range and carrier phase measurements and estimate a coordinate of itself with the measurements. In a "current" epoch, epoch nafter a reference epoch, epoch m, the standalone GNSS receiver receives a signal, determines a set of comparison data (signal and the observables), saves the signal and/or observables to the standalone GNSS receiver, and performs an RTK to determine position. In some embodiments, the current epoch's set of comparison data is saved to a standalone GNSS receiver storage medium and replaces a set of reference data as new reference data.

The measurements at epoch m which are used as reference data are described as following:

$$P^i_{m,k} = \rho^i_m + c \cdot (dT_{r,m} - dt^i_{s,m}) + Orb^i_m + Trop^i_m + \frac{f_1^2}{f_m^2} Iono^i_m + v^i_k \qquad \text{(Equation 1)}$$

-continued $$\Phi_{m,k}^i = \rho_m^i + c \cdot (dT_{r,m} - dt_{s,m}^i) + \quad \text{(Equation 2)}$$
$$Orb_m^i + Trop_m^i - \frac{f_1^2}{f_k^2} Iono_m^i + \lambda_k N_{m,k}^i + \varepsilon_k^i$$

where: $P_{m,k}^i$ is pseudo-range measurement of frequency k for satellite i at epoch m;
$\rho_m^i$ is geometric distance between satellite i and antenna phase center at epoch m;
c is speed of light in vacuum;
$dT_{r,m}$ is receiver clock error at epoch m;
$dt_{s,m}^i$ is satellite i clock error at epoch m;
$Orb_m^i$ is satellite i orbit error at epoch m;
$Trop_m^i$ is satellite i troposphere error at epoch m;
$Iono_m^i$ is satellite i ionosphere error at epoch m;
$f_1^2$ and $f_k^2$ are the square of frequency $L_1$ and $L_k$, respectively, k may be 1, 2 or 3;
$\upsilon_k^i$ is multipath and noise of frequency k pseudo-range;
$\Phi_{m,k}^i$ is carrier phase measurement of frequency k for satellite i at epoch m;
$\lambda_k$ is wavelength of frequency k; $N_{m,k}^i$ is integer ambiguity of frequency k for satellite i at epoch m; and
$\varepsilon_k^i$ is multipath and noise of frequency k carrier phase.

The measurements at epoch n, which are used as standalone GNSS receiver, or rover, data, are described as following in equations (3) and (4), below, $$P_{n,k}^i = \rho_n^i + c \cdot (dT_{r,n} - dt_{s,n}^i) + Orb_n^i + Trop_n^i + \frac{f_1^2}{f_n^2} Iono_n^i + \upsilon_k^i \quad \text{(Equation 3)}$$

$$\Phi_{n,k}^i = \rho_n^i + c \cdot (dT_{r,n} - dt_{s,n}^i) + \quad \text{(Equation 4)}$$
$$Orb_n^i + Trop_n^i - \frac{f_1^2}{f_k^2} Iono_n^i + \lambda_k N_{n,k}^i + \varepsilon_k^i$$

Where n indicates epoch n, and n=m+1.

After performing a single-difference between epoch m and n, and then another single-difference between satellite i and j, the double-differenced measurements are described by equations (5) and (6), below, $$\nabla\Delta P_{mn,k}^{ij} = \nabla\Delta\rho_{mn}^{ij} + \nabla\Delta Orb_{mn}^{ij} - \quad \text{(Equation 5)}$$
$$c \cdot \nabla\Delta dt_{s,mn}^{ij} + \nabla\Delta Trop_{mn}^{ij} + \frac{f_1^2}{f_k^2} \nabla\Delta Iono_{mn}^{ij} + \nabla\Delta\upsilon_k^{ij}$$

$$\nabla\Delta\Phi_{mn,k}^{ij} = \nabla\Delta\rho_{mn}^{ij} + \nabla\Delta Orb_{mn}^{ij} - c \cdot \nabla\Delta dt_{s,mn}^{ij} + \quad \text{(Equation 6)}$$
$$\nabla\Delta Trop_{mn}^{ij} - \frac{f_1^2}{f_k^2} \nabla\Delta Iono_{mn}^{ij} + \lambda_k \nabla\Delta N_{mn,k}^{ij} + \nabla\Delta\varepsilon_k^{ij}$$

where:
$\Delta$ is a single difference operator between epoch m and n;
$\nabla$ is a single difference operator between satellite i and j;
$\nabla\Delta P_{mn,k}^{ij}$ is double-differenced pseudo-range measurement of frequency k;
$\nabla\Delta\rho_{mn}^{ij}$ is double-differenced geometric distance;
$\nabla\Delta dt_{s,mn}^{ij}$ is double-differenced satellite clock residual;
$\nabla\Delta Orb_{mn}^{ij}$ is double-differenced satellite orbit residual;
$\nabla\Delta Trop_{mn}^{ij}$ is double-differenced troposphere residual;
$\nabla\Delta Iono_{mn}^{ij}$ is double-differenced ionosphere residual;
$\nabla\Delta\upsilon_k^{ij}$ is double-differenced multipath residual and noise of frequency k pseudo-range;

$\nabla\Delta\Phi_{mn,k}^{ij}$ is double-differenced carrier phase measurement of frequency k;
$\nabla\Delta N_{mn,k}^{ij}$ is double-differenced integer ambiguity of frequency k; and
$\nabla\Delta\varepsilon_k^{ij}$ is double-differenced multipath residual and noise of frequency k carrier phase.

Ionosphere and troposphere errors are modeled before double-differenced, using Klobuchar and Saastamoinen models, respectively. The double-differenced ionosphere residual is frequency square dependent and has a different sign for pseudo-range and carrier phase. However, double-differenced troposphere residual, satellite orbit residual and satellite clock residual are frequency independent and have a same sign for pseudo-range and carrier phase. All the three types of residuals change slowly with time. In at least one embodiment of the present disclosure, they are estimated as one state, namely $\nabla\Delta d_{geo}^{ij}$. Where:

$$\nabla\Delta d_{geo}^{ij} = \nabla\Delta Orb_{mn}^{ij} - c \cdot \nabla\Delta dt_{s,mn}^{ij} + \nabla\Delta Trop_{mn}^{ij} \quad \text{(Equation 7)}$$

Using Equation (7) it is possible to rewrite Equations (5) and (6) as:

$$\nabla\Delta P_{mn,k}^{ij} = \nabla\Delta\rho_{mn}^{ij} + \nabla\Delta d_{geo}^{ij} + \frac{f_1^2}{f_k^2} \nabla\Delta Iono_{mn}^{ij} + \nabla\Delta\upsilon_k^{ij} \quad \text{(Equation 8)}$$

$$\nabla\Delta\Phi_{mn,k}^{ij} = \quad \text{(Equation 9)}$$
$$\nabla\Delta\rho_{mn}^{ij} + \nabla\Delta d_{geo}^{ij} - \frac{f_1^2}{f_k^2} \nabla\Delta Iono_{mn}^{ij} + \lambda_k \nabla\Delta N_{mn,k}^{ij} + \nabla\Delta\varepsilon_k^{ij}$$

In at least one embodiment of the present disclosure, the states are estimated with a Kalman filter using double-differenced pseudo-range and carrier phase measurements. The state vector is shown in Table 1. The L1 measurements include GPS L1, GLONASS G1, BDS B1, Galileo E1, or QZSS L1. The L2 measurements include GPS L2, GLONASS G2, BDS B2, Galileo E5b, or QZSS L2. The L3 measurements include GPS L5, BDS B3, Galileo E5a, QZSS L5, or IRNSS L5.

TABLE 1

Kalman Filter State Vector

| States | Dimension | Notes |
|---|---|---|
| Position component X | 1 | Mandatory |
| Position component Y | 1 | Mandatory |
| Position component Z | 1 | Mandatory |
| Double-differenced ionosphere residuals | Nsat-1 | Mandatory |
| Double-differenced geometry residuals | Nsat-1 | Mandatory |
| Double-differenced L1 ambiguities | Nsat-1 | If L1 measurement available |
| Double-differenced L2 ambiguities | Nsat-1 | If L2 measurement available |
| Double-differenced L3 ambiguities | Nsat-1 | If L3 measurement available |

Position components X, Y and Z are modeled as random walk processes. Double-differenced ionosphere residuals are modeled as first-order Gauss-Markov processes. Double-differenced geometry residuals, which include double-differenced troposphere residuals, double-differenced satellite orbit and clock residuals, are modeled as first-order Gauss-Markov process also. Double-differenced L1 ambiguity, L2 ambiguity, and L3 ambiguity, if available, are estimated as constants. Even a receiver can track triple-frequency signals, interference may lead to lose of track at any frequency. In the present invention, measurements from any frequency are used in Kalman Filter independently.

If there are no cycle slips between epoch m, which works as reference, and n (n=m+1), which works as rover, all ambiguities are zero and ambiguity resolution does not need to be performed. In some embodiments, when signal is weak for low elevation angle, or signal is interrupted by interference for a standalone receiver which works as a static reference station, or a kinematic standalone GNSS receiver passes foliage, or in urban canyon, signal lock extends to multiple signal sources, cycle-slip may happen in those environment. Sometimes a receiver track loop may detect loss of lock and flag the cycle-slip. Sometimes a receiver track loop may not detect loss of lock then un-flagged cycle-slip happens. Un-flagged cycle-slip, no matter what happens at a receiver, works as reference station or a rover, and will cause big positioning error in traditional RTK. Even if a flagged cycle-slip happens at a receiver working as reference station, all rovers connected with the reference station have to perform ambiguity resolution, which may not get fix immediately. If reference station can detect and repair cycle-slip, the RTK performance of all rovers connected with the reference station will be improved.

When cycle-slip happens between epoch m and n (n=m+1), ambiguities are non-zero, and are float ambiguities. In at least one embodiment of the present disclosure, the least-squares ambiguity decorrelation (LAMBDA) method of Teunissen described above, is applied for ambiguity resolution. Once the float ambiguities are fixed, that means all ambiguities are zero or non-zero; and non-zero ambiguities are fixed integers, cycle-slips are detected and are able to be repaired.

Once all ambiguities are known, if all ambiguities are zero, there are no cycle-slips between epoch m and n (n=m+1). If there are non-zero ambiguities, cycle-slips happened between epoch m and n for the carrier-phases with non-zero ambiguities. Thus ambiguity resolution with double-differenced measurements between consecutive epochs can detect cycle-slip. The cycle-slip can also be repaired. Base on Equation 2, 4 and 6, $$\nabla \Delta N_{mn,k}^{ij} = \Delta N_{mn,k}^i - \Delta N_{mn,k}^j = N_{n,k}^i - N_{m,k}^i - \Delta N_{mn,k}^j \quad \text{(Equation 10)}$$

If cycle-slip happens for satellite i frequency k between epoch m and n, then $\nabla \Delta N_{mn,k}^{ij}$ is non-zero integer, and $N_{n,k}^i = N_{m,k}^i + \nabla \Delta N_{mn,k}^{ij}$. Here we assume there is no cycle-slip for reference satellite j frequency k between epoch m and n, $\Delta N_{mn,k}^j = 0$. The assumption is reasonable because reference satellite is normally the satellite with highest elevation angle and strongest signal, which seldom produces cycle-slip. Even if cycle-slip happens for the reference satellite, then the double differenced ambiguities of all non-reference satellite will include the same amount of $\Delta N_{mn,k}^j$, which will be cancelled in double-differential operation.

Replace $N_{n,k}^i$ as $N_{m,k}^i + \nabla \Delta N_{mn,k}^{ij}$ in Equation 4, $$\Phi_{n,k}^i = \rho_n^i + c \cdot (dT_{r,n} - dt_{s,n}^i) + Orb_n^i + \quad \text{(Equation 11)}$$
$$Trop_n^i - \frac{f_1^2}{f_k^2} Iono_n^i + \lambda_k (N_{m,k}^i + \nabla \Delta N_{mn,k}^{ij}) + \varepsilon_k^i$$

Therefore, the cycle-slip between epoch m and epoch n for satellite i frequency k can be repaired as:

$$\Phi_{n,k,rep}^i = \Phi_{n,k}^i - \nabla \Delta N_{mn,k}^{ij} \quad \text{(Equation 12)}$$

$$\Phi_{n,k,rep}^i = \rho_n^i + c \cdot (dT_{r,n} - dt_{s,n}^i) + \quad \text{(Equation 13)}$$
$$Orb_n^i + Trop_n^i - \frac{f_1^2}{f_k^2} Iono_n^i + \lambda_k N_{m,k}^i + \varepsilon_k^i$$

Where, $\Phi_{n,k,rep}^i$ is the new carrier-phase of satellite i frequency k of epoch n after repaired cycle-slip. Compare Equation 13 with Equation 2, the repaired carrier-phase has the same ambiguity $N_{m,k}^i$ as epoch m.

Reference station switches to current epoch n, with cycle-slip repaired carrier-phase if any non-zero ambiguity exists, and so forth. Regardless of whether the ambiguity can be fixed between epoch m and n or not, the reference station switches to current epoch n. For those epochs where non-zero ambiguities exist between consecutive epochs, cycle-slip is detected and repaired.

Embodiments of the present disclosure are usable for a receiver which work as a reference station. The reference station detects cycle-slip and sends out measurements with cycle-slip repaired to rovers. The performance of rovers can be greatly improved if the rovers are connected with a cycle-slip free reference station.

Figure 2:
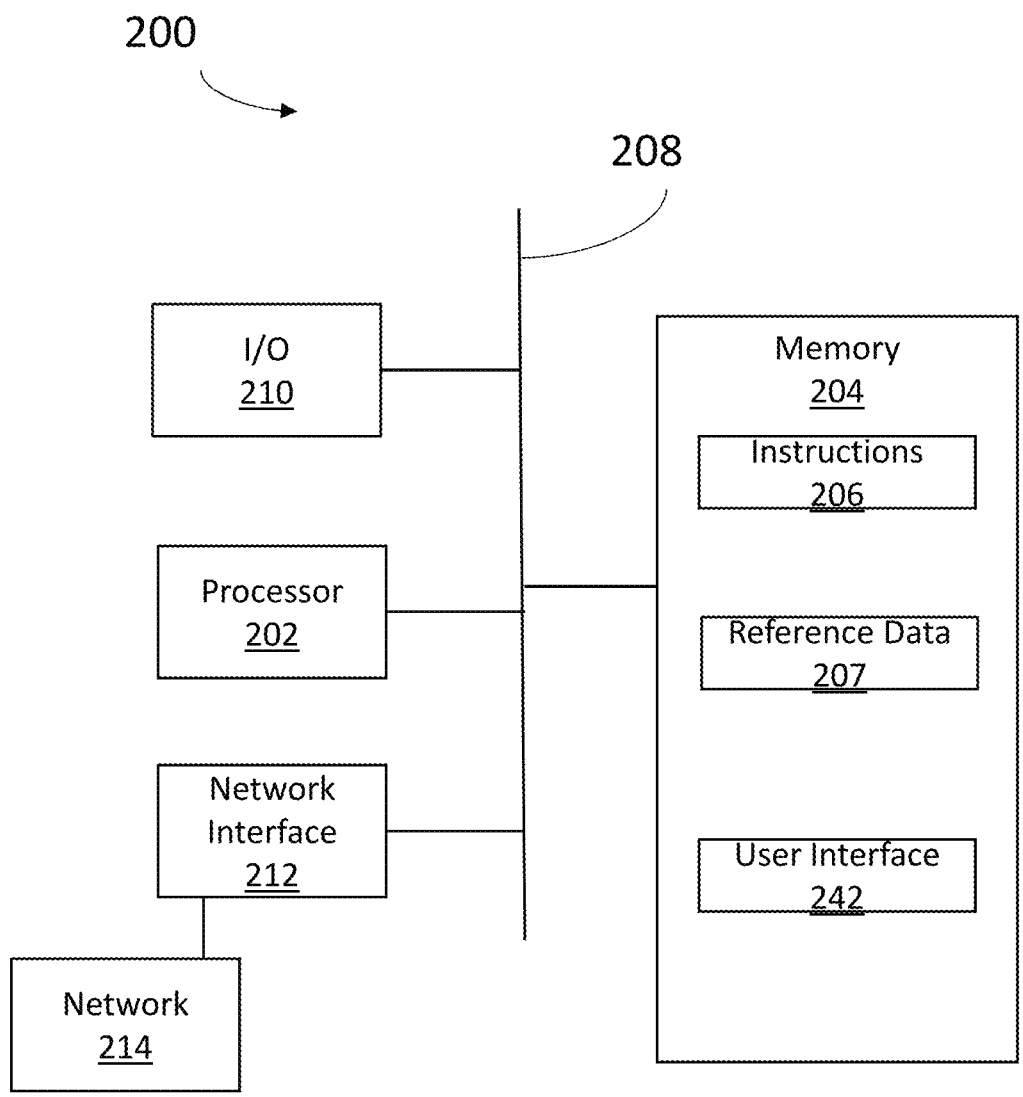
FIG. 2 is a schematic diagram of a standalone GNSS receiver in accordance with some embodiments.

FIG. 2 is a block diagram of a GNSS receiver 200, in accordance with some embodiments. Methods described herein of position determination, in accordance with one or more embodiments, are implementable, for example, using GNSS receiver 200, in accordance with some embodiments. In some embodiments, GNSS receiver 200 is a computing device including a hardware processor 202 and a non-transitory, computer-readable storage medium 204. Storage medium 204, amongst other things, is encoded with, i.e., stores, computer program code 206, i.e., a set of executable instructions. Execution of instructions 206 by hardware processor 202 represents (at least in part) an the equations provided above with regard to performing positioning, and instructions related to operating receiving and sending information using the hardware components of the standalone GNSS receiver. The instructions disclosed here are configured to enable the standalone GNSS receiver to perform some or all of the methods described herein.

Processor 202 is electrically coupled to computer-readable storage medium 204 via a bus 208. Processor 202 is also electrically coupled to an I/O interface 210 by bus 208. A communication interface 212 is also electrically connected to processor 202 via bus 208. Communication interface 212 is connected to a network 214, so that processor 202 and computer-readable storage medium 204 are capable of connecting to external elements via network 214. Processor 202 is configured to execute computer program code 206 encoded in computer-readable storage medium 204 in order to cause GNSS receiver 200 to be usable for performing a portion or all of the noted processes and/or methods. In one or more embodiments, processor 202 is a central processing unit (CPU), a multi-processor, a distributed processing system, an application specific integrated circuit (ASIC), and/or a suitable processing unit.

In one or more embodiments, computer-readable storage medium 204 is an electronic, magnetic, optical, electromagnetic, infrared, and/or a semiconductor system (or apparatus or device). For example, computer-readable storage medium 204 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 204 includes a compact disk-read only memory (CD-ROM), a compact disk-read/write (CD-R/W), and/or a digital video disc (DVD).

In one or more embodiments, storage medium 204 stores computer program code 206 configured to cause GNSS receiver 200 (where such execution represents (at least in part) the EDA tool) to be usable for performing a portion or all of the noted processes and/or methods. In one or more embodiments, storage medium 204 also stores information which facilitates performing a portion or all of the noted processes and/or methods. In one or more embodiments, storage medium 204 stores reference data 207 for use in comparing with other signals received at communication interface 212.

GNSS receiver 200 includes I/O interface 210. I/O interface 210 is coupled to external circuitry. In one or more embodiments, I/O interface 210 includes a keyboard, keypad, mouse, trackball, trackpad, touchscreen, and/or cursor direction keys for communicating information and commands to processor 202.

GNSS receiver 200 also includes communication interface 212 coupled to processor 202. Communication interface 212 allows GNSS receiver 200 to communicate with a network 214, such as a global positioning satellite, to which one or more other navigation systems are connected. Communication interface 212 includes one or more of GPS, GLONASS, BDS, Galileo, QZSS, IRNSS, and so forth. In one or more embodiments, a portion or all of noted processes and/or methods, is implemented in two or more GNSS receivers 200.

GNSS receiver 200 is configured to receive information through I/O interface 210. The information received through I/O interface 210 includes one or more of instructions, data, design rules, libraries of standard cells, and/or other parameters for processing by processor 202. The information is transferred to processor 202 via bus 208. GNSS receiver 200 is configured to receive information related to a UI through I/O interface 210. The information is stored in computer-readable medium 204 as user interface (UI) 242.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of a global navigation receiver.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of determining position, the method comprising:
    observing a first signal from a first source at a first epoch;
    observing a second signal from the first source at a second epoch;
    observing a third signal from a second source at the first epoch;
    observing a fourth signal from the second source at the second epoch;
    generating a first set of comparison data based on the first signal and the second signal;
    generating a second set of comparison data based on the third signal and the fourth signal;
    determining whether cycle-slip exists based on the first set of comparison data and the second set of comparison data; and
    determining a current position of a standalone global navigation satellite system (GNSS) receiver in response to a determination that cycle-slip does not exist,
    wherein generating the first set of comparison data comprises resolving ambiguities using least-squares ambiguity decorrelation, and
    wherein determining whether cycle-slip exists comprises determining that cycle-slip exists in response to a determination that the resolved ambiguity is non-zero.

2. The method of claim 1, further comprising repairing the cycle-slip in response to a determination that cycle-slip does exist.

3. The method of claim 2, further comprising determining the current position of the standalone GNSS receiver based on the repaired cycle-slip in response to the determination that cycle-slip does exist.

4. The method of claim 1, wherein repairing cycle-slip with the non-zero ambiguity for observable that detected cycle-slip.

5. The method of claim 1, wherein determining whether cycle-slip exists comprises determining that cycle-slip does not exist in response to a determination that the resolved ambiguity is zero.

6. The method of claim 1, wherein observing the first signal comprises observing the first signal from a first satellite, and observing the third signal comprises observing the third signal from a second satellite.

7. The method of claim 6, wherein the second satellite has a higher elevation than the first satellite.

8. A standalone global navigation satellite system (GNSS) comprising:
    a non-transitory computer readable medium configured to store instructions thereon; and
    a processor connected to the non-transitory computer readable medium, wherein the processor is configured to execute the instructions for:
        observing a first signal from a first source at a first epoch;
        observing a second signal from the first source at a second epoch;
        observing a third signal from a second source at the first epoch;

observing a fourth signal from the second source at the second epoch;

generating a first set of comparison data based on the first signal and the second signal;

generating a second set of comparison data based on the third signal and the fourth signal;

determining whether cycle-slip exists based on the first set of comparison data and the second set of comparison data; and determining a current position of a standalone global navigation satellite system (GNSS) receiver in response to a determination that cycle-slip does not exist, wherein the processor is further configured to execute the instructions for generating the first set of comparison data by resolving ambiguities using least-squares ambiguity decorrelation, and wherein the processor is further configured to execute the instructions for determining whether cycle-slip exists by determining that cycle-slip exists in response to a determination that the resolved ambiguity is non-zero.

9. The standalone GNSS of claim 8, wherein the processor is further configured to execute the instructions for repairing the cycle-slip in response to a determination that cycle-slip does exist.

10. The standalone GNSS of claim 9, wherein the processor is further configured to execute the instructions for determining the current position of the standalone GNSS receiver based on the repaired cycle-slip in response to the determination that cycle-slip does exist.

11. The standalone GNSS of claim 8, wherein the processor is further configured to execute the instructions for determining whether cycle-slip exists by determining that cycle-slip does not exist in response to a determination that the resolved ambiguity is zero.

12. The standalone GNSS of claim 8, wherein the processor is further configured to execute the instructions for observing the first signal from a first satellite, and observing the third signal from a second satellite.

13. A method of determining position, the method comprising:

observing a plurality of first signals from a first satellite;

observing a plurality of second signal from a reference satellite;

generating a first set of comparison data based on the plurality of first signals;

generating a second set of comparison data based on the plurality of second signals;

determining whether cycle-slip exists for the first satellite based on the first set of comparison data and the second set of comparison data;

determining a current position of a standalone global navigation satellite system (GNSS) receiver using the plurality of first signals in response to a determination that cycle-slip does not exist; and repairing the cycle-slip of the first satellite in response to a determination that cycle-slip does exist, wherein generating the first set of comparison data comprises resolving ambiguities using least-squares ambiguity decorrelation, and determining whether cycle-slip exists comprises determining that cycle-slip exists in response to a determination that the resolved ambiguity is non-zero.

14. The method of claim 13, further comprising determining the current position of the standalone GNSS receiver based on the repaired cycle-slip in response to the determination that cycle-slip does exist.

* * * * *